(12) United States Patent
Onoguchi

(10) Patent No.: US 6,205,242 B1
(45) Date of Patent: Mar. 20, 2001

(54) IMAGE MONITOR APPARATUS AND A METHOD

(75) Inventor: Kazunori Onoguchi, Hyogo-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/161,428

(22) Filed: Sep. 24, 1998

(30) Foreign Application Priority Data

Sep. 29, 1997 (JP) .................................................. 9-263602
May 14, 1998 (JP) ................................................ 10-132191

(51) Int. Cl.⁷ .............................. G06K 9/00; G06K 9/68; G06K 9/36; G09G 5/36; G01C 3/14
(52) U.S. Cl. .......................... 382/154; 382/103; 382/190; 382/218; 382/276; 382/283; 345/139; 356/12
(58) Field of Search .................................... 382/103, 104, 382/128, 154, 190, 218, 276, 283; 345/139; 356/12

(56) References Cited

U.S. PATENT DOCUMENTS

| | | | |
|---|---|---|---|
| 5,159,648 | * 10/1992 | Ogura et al. | 382/298 |
| 5,202,928 | * 4/1993 | Tomita et al. | 382/154 |
| 5,530,441 | * 6/1996 | Takatou et al. | 340/937 |
| 5,694,483 | 12/1997 | Onoguchi | 382/154 |
| 5,706,355 | * 1/1998 | Raboisson et al. | 382/104 |
| 5,748,778 | 5/1998 | Onoguchi | 382/199 |
| 5,859,922 | * 1/1999 | Hoffmann | 382/128 |
| 5,867,592 | * 2/1999 | Sasada et al. | 382/154 |
| 6,035,067 | * 3/2000 | Ponticos | 382/226 |

OTHER PUBLICATIONS

Rechsteiner, et al. "implementation aspects of a real time workspace monitoring system", IEEE, pp. 810–814, Jul. 1995.*

* cited by examiner

Primary Examiner—Phuoc Tran
Assistant Examiner—Daniel G. Mariam
(74) Attorney, Agent, or Firm—Oblon, Spivak, McClelland, Maier & Neustadt, P.C.

(57) ABSTRACT

In the image monitor apparatus, a plurality of images are respectively inputted through a plurality of TV camera from each view position. An image projection section projects each of the plurality of images onto a predetermined plane in three-dimensional space. A comparison section compares the projected image data of two images by unit of predetermined area on the plane, and extracts the predetermined areas, each of which two projected image data are different, from the plane. An extraction section extracts an existence position of a monitored object from the predetermined areas extracted. An integration section integrates the existence positions of the monitored object extracted for the projected image data of all of two images in the plurality of images as all existence positions of the monitored objects on the plane.

34 Claims, 12 Drawing Sheets

IMAGE MONITOR APPARATUS AND A METHOD

FIELD OF THE INVENTION

The present invention relates to an image monitor apparatus and a method to extract the existence of a monitored object or the motion of the monitored object from an image of a plane area such as a marked crosswalk.

BACKGROUND OF THE INVENTION

An ultrasonic sensor is used to measure the traffic flow or detect cars waiting for a traffic signal. The ultrasonic sensor can detect only solid objects, which adequately reflect the ultrasonic wave. Therefore, the ultrasonic sensor is not suitable for detection of a person. Furthermore, the measurement area of the ultrasonic sensor is narrow. Therefore, it is difficult to detect the existence or the number of persons waiting for a red signal adjacent to the marked crosswalk, or the flow quantity of pedestrians going across by the blue signal on the marked crosswalk.

Accordingly, a method for monitoring pedestrians using an input image through TV camera is developed. As a monitoring method using a video, the following three methods are mainly considered. As a frame differential method, the difference between two images inputted at two different points in time is calculated to detect the moving area as the pedestrian. As a background image subtraction method, the difference between the input image and the background image previously prepared is calculated to detect the area whose brightness is different from the background as the pedestrian. As an optical flow method, motion of each pixel in the image is calculated to detect the area of the pedestrian, in which each pixel is moving straight at constant speed along a predetermined direction.

However, the above-mentioned three methods respectively include the following defects. The frame differential method is not applied to a person standing still such as a pedestrian waiting for the traffic signal. In the background image subtraction method, in the case of an outdoor monitor area, an update of the background image according to changes in sunlight is difficult. Furthermore, a shadow area of the pedestrian and a brightness change area on the road caused by a car headlight are included in the detection area. Therefore, these areas must be excluded. In the optical flow method, expensive calculation cost is required for extraction of the optical flow from the image. Furthermore, the person standing still is not detected by the optical flow method.

SUMMARY OF THE INVENTION

It is one object of the present invention to provide an image monitor apparatus and a method to correctly extract the monitored object from the image without erroneous detection caused by the shadow cast by the monitored object and the brightness change area on the road plane.

According to the present invention, there is provided an image monitor apparatus, comprising: a plurality of image input means for respectively inputting an image based on each particular view position; an image projection means for projecting each of the plurality of images onto a predetermined plane in three-dimensional space; a comparison means for comparing projected image data of two images by unit of predetermined area on the plane and for extracting the predetermined areas, the projected image data of which are different, from the plane; an extraction means for extracting the existence position of a monitored object from the predetermined areas extracted by said comparison means; and a integration means for integrating or normalizing the existence positions of the monitored object extracted for the projected image data of all of the two images in the plurality of images as all existence positions of the monitored objects on the plane.

Further in accordance with the present invention, there is also provided an image monitor apparatus, comprising: at least two image input means for respectively inputting an image based on each particular view position; a transformation means for transforming the image inputted through one image input means according to a view position of the other image input means; a comparison means for comparing image data of the transformed image with image data of the image inputted through the other image input means by unit of same position on the image, and for generating a mask image representing the position of different image data according to the comparison result; and an extraction means for extracting an area of a monitored object from the mask image.

Further in accordance with the present invention, there is also provided a method for monitoring an object in an image, comprising the steps of: inputting a plurality of images from each particular view position; projecting each of the plurality of images onto a predetermined plane in three-dimensional space; comparing projected image data of two images by unit of predetermined area on the plane; extracting the predetermined areas, the projected image data of which are different, from the plane; extracting an existence position of a monitored object from the predetermined areas extracted; and integrating the existence positions of the monitored object extracted for the projected image data of all of the two images in the plurality of images as all existence positions of the monitored objects on the plane.

Further in accordance with the present invention, there is also provided a method for monitoring an object in an image, comprising the steps of: inputting two images from each particular view position; transforming one image inputted from one view position according to the other view position; comparing image data of the transformed image with image data of the other image inputted from the other view position by unit of the same position on the image; generating a mask image representing the position of different image data according to the comparison result; and extracting an area of a monitored object from the mask image.

Further in accordance with the present invention, there is also provided a computer readable memory containing computer readable instructions, comprising: an instruction means for causing a computer to input a plurality of images from each particular view position; an instruction means for causing a computer to project each of the plurality of images onto a predetermined plane in three-dimensional space; an instruction means for causing a computer to compare projected image data of two images by unit of predetermined area on the plane; an instruction means for causing a computer to extract the predetermined areas, the projected image data of which are different, from the plane; an instruction means for causing a computer to extract the existence position of a monitored object from the predetermined areas extracted; and an instruction means for causing a computer to integrate the existence positions of the monitored object extracted for the projected image data of all of the two images in the plurality of images as all existence positions of the monitored objects on the plane.

Further in accordance with the present invention, there is also provided a computer readable memory containing computer readable instructions, comprising: an instruction means for causing a computer to input two images from each particular view position; an instruction means for causing a computer to transform one image inputted from one view position according to the other view position; an instruction means for causing a computer to compare image data of the transformed image with image data of the other image inputted from the other view position by unit of same position on the image; an instruction means for causing a computer to generate a mask image representing the position of different image data according to the comparison result; and an instruction means for causing a computer to extract an area of a monitored object from the mask image.

DETAILED DESCRIPTION OF THE PREFERRED EMBODIMENTS

Figure 1:
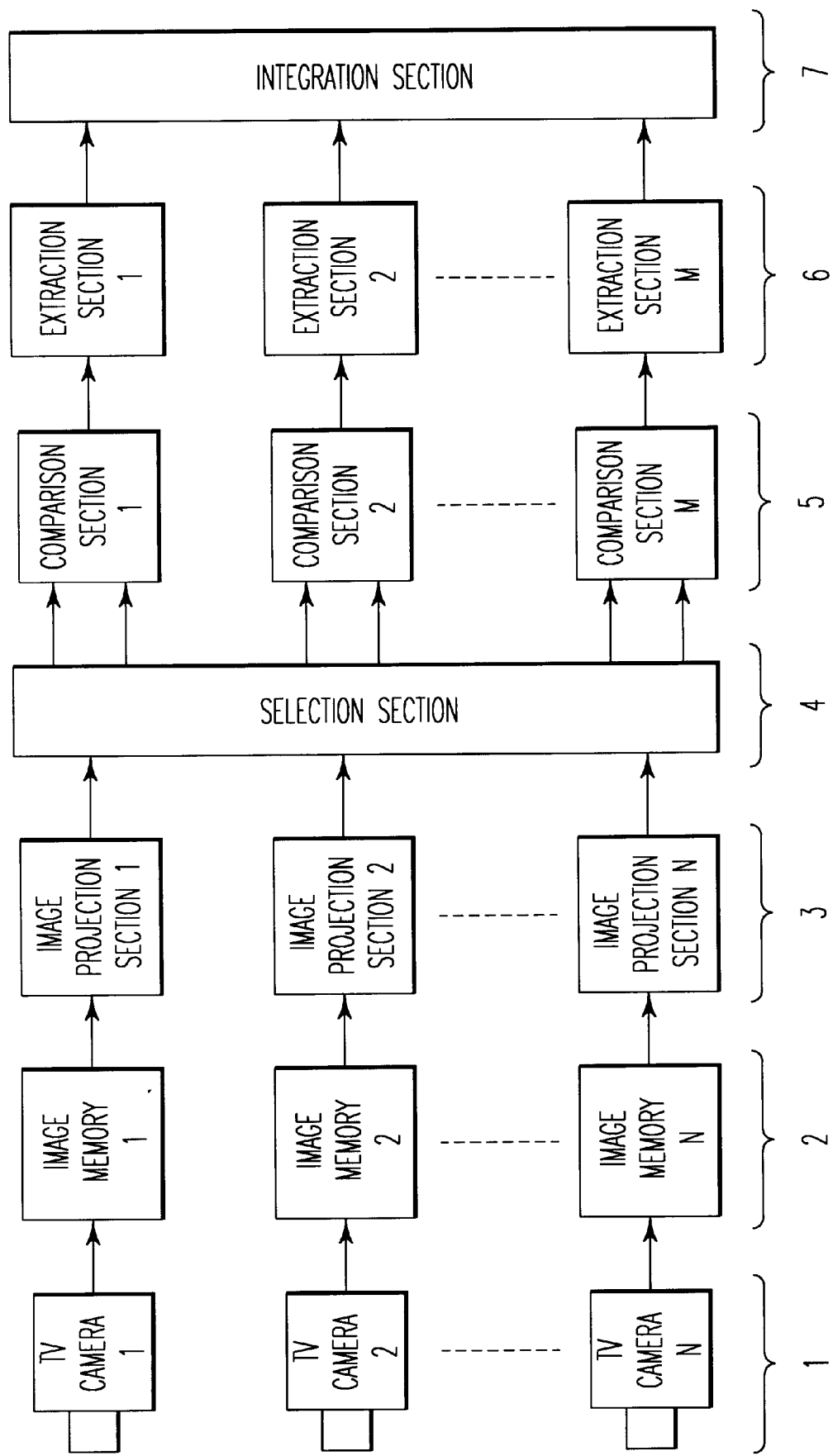
FIG. 1 is a block diagram of the image monitor apparatus according to a first embodiment of the present invention.
Figure 2:
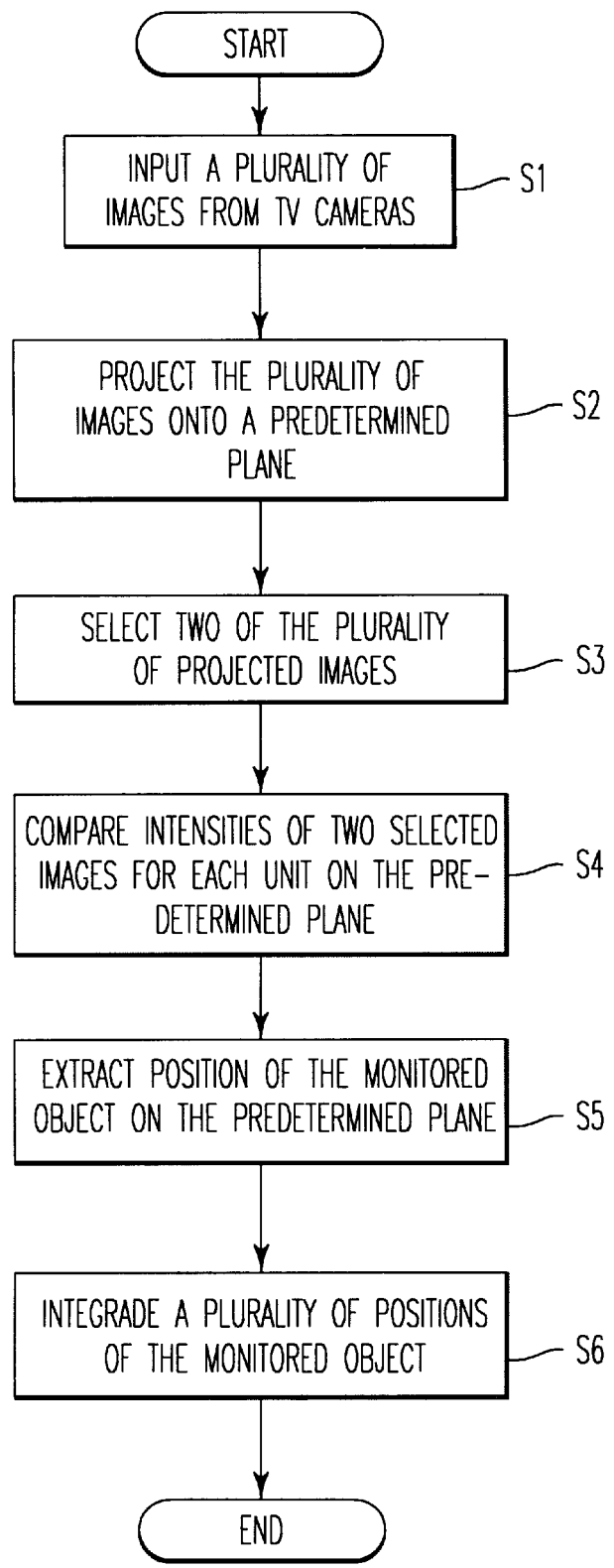
FIG. 2 is a flow chart of processing of the image monitor method according to the first embodiment of the present invention.

Embodiments of the present invention will be explained while referring to the Figures. FIG. 1 is a block diagram of the image monitor apparatus according to the first embodiment of the present invention. The image monitor apparatus consists of TV cameras 1, image memories 2, image projection sections 3, a selection section 4, comparison sections 5, extraction sections 6, and an integration section 7. FIG. 2 is a flow chart of the processing of the image monitor method according to the first embodiment of the present invention. First, n units of TV cameras 1 respectively input the image (S1 in FIG. 2). These images are stored in n units of the image memories 2. Then, n units of the image projection sections 3 project or map each image onto a predetermined plane (P:ax+by+cz=0) based on coordinate axis Cxyz in three-dimensional space (S2 in FIG. 2). In this case, after setting the coordinate axis Cxyz in the monitor area by a measurement machine, a plurality of positions of sample points in this coordinate axis are measured and the plane equation, including the sample points, is determined by the least square method. In the case of a cross point area including a marked crosswalk as the monitor area, a plurality of sample points are set on the road and positions of the sample points are measured by the measurement machine. In case of an indoor passage, the sample points are set on the floor of the passage.

Figure 3:
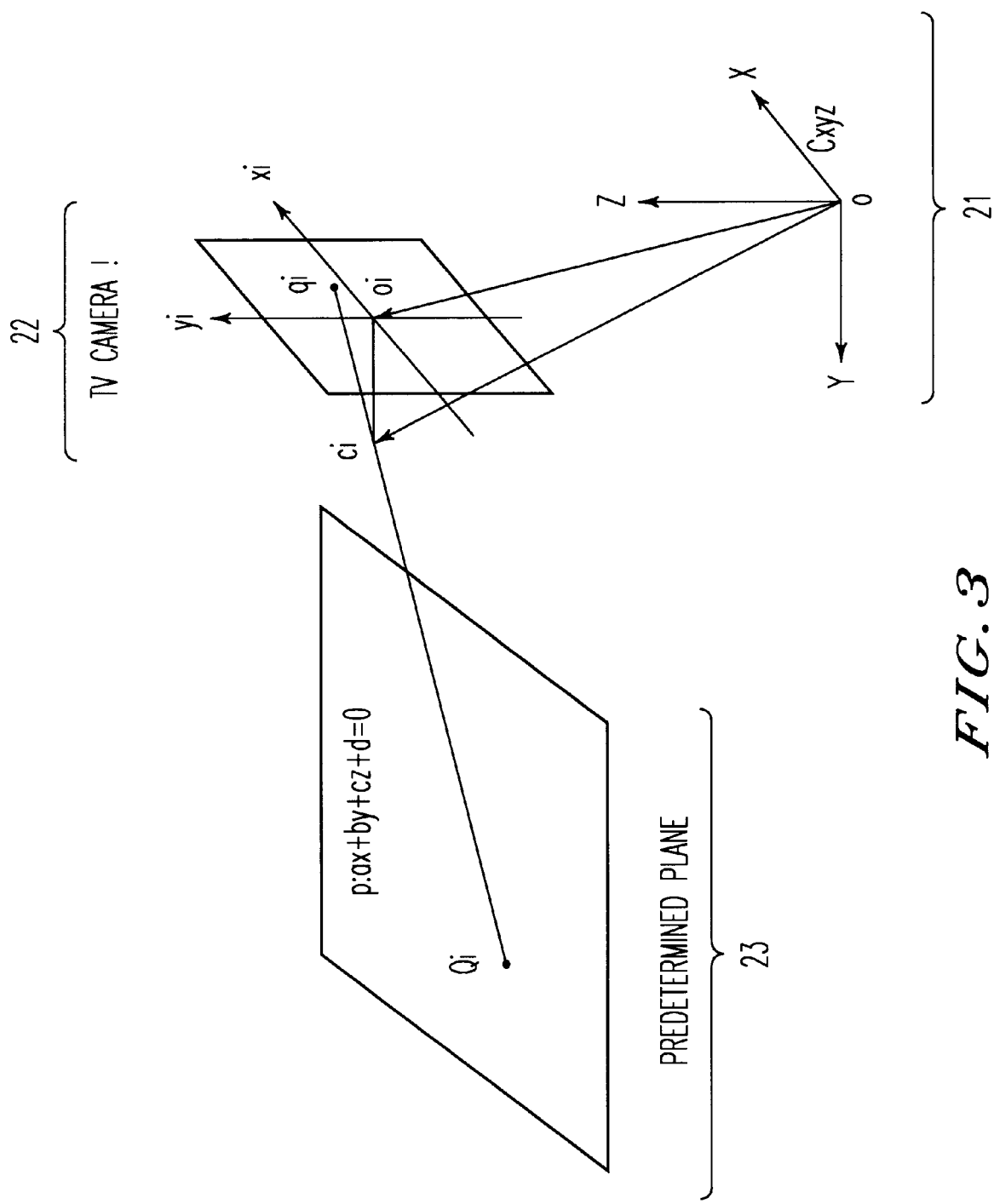
FIG. 3 is a schematic diagram of projecting an image onto a predetermined plane according to the first embodiment of the present invention.

FIG. 3 is a schematic diagram of a projection method suitable for the image monitor apparatus of the first embodiment. Assume that the origin of the coordinate axis Cxyz of the monitor area 21 is "O", a center point of the image 22 of TV camera i ($1 \leq i \leq n$) is "Oi", a focus position of TV camera i is "Ci", a projection point of the point qi of the image 23 onto a plane 23 is "Qi", the coordinate axis in which the origin is the center of the image 22 is respectively "xi, yi", the vector of one pixel size along the X axis on the image 22 based on the origin Oi is "nix", the vector of one pixel size along the Y axis on the image based on the origin Oi is "niy", the position of the point qi onto the image plane is "(kix, kiy)". The position Qi of the point qi projected onto the plane P in the coordinate axis Cxyz is calculated by the following equations.

$$\overrightarrow{OQi} = \overrightarrow{Oqi} + t(\overrightarrow{Oci} - \overrightarrow{Oqi})$$

$$\overrightarrow{Oqi} = \overrightarrow{OOi} + kix\overrightarrow{nix} + kiy\overrightarrow{niy}$$

As for TV camera i ($1 \leq i \leq n$), the following parameters are previously calculated by a calibration board and a measurement machine.

$$\overrightarrow{Ooi} = (x_{oi}, y_{oi}, z_{oi})$$

$$\overrightarrow{Oci} = (x_{ci}, y_{ci}, z_{ci})$$

$$\overrightarrow{nix} = (x_{nix}, y_{nix}, z_{nix})$$

$$\overrightarrow{niy} = (x_{niy}, y_{niy}, z_{niy})$$

In this case, the equation of a straight line between Qi and qi is represented as follows.

$$x = x_{oi} + k_{ix}x_{nix} + k_{iy}x_{niy} + t(x_{ci} - x_{oi} - k_{ix}x_{nix} - k_{iy}x_{niy})$$

$$y = y_{oi} + k_{ix}y_{nix} + k_{iy}y_{niy} + t(y_{ci} - y_{oi} - k_{ix}y_{nix} - k_{iy}y_{niy})$$

$$z = z_{oi} + k_{ix}z_{nix} + k_{iy}z_{niy} + t(z_{ci} - z_{oi} - k_{ix}z_{nix} - k_{iy}z_{niy})$$

The above equations of (x,y,z) are assigned to the plane equation P(ax+by+cz=0). By determining t, the position of the projection point Qi (Qix, Qiy, Qiz) is calculated. The image projection section i ($1 \leq i \leq n$) projects all pixels (qi= (kix, kiy)) stored in the image memory i onto the plane P. In this way, projection data consisting of a projection position (Qix, Qiy, Qix) and an intensity value (original density value) of the point qi is outputted to the selection section 4.

Figures 4, 5:
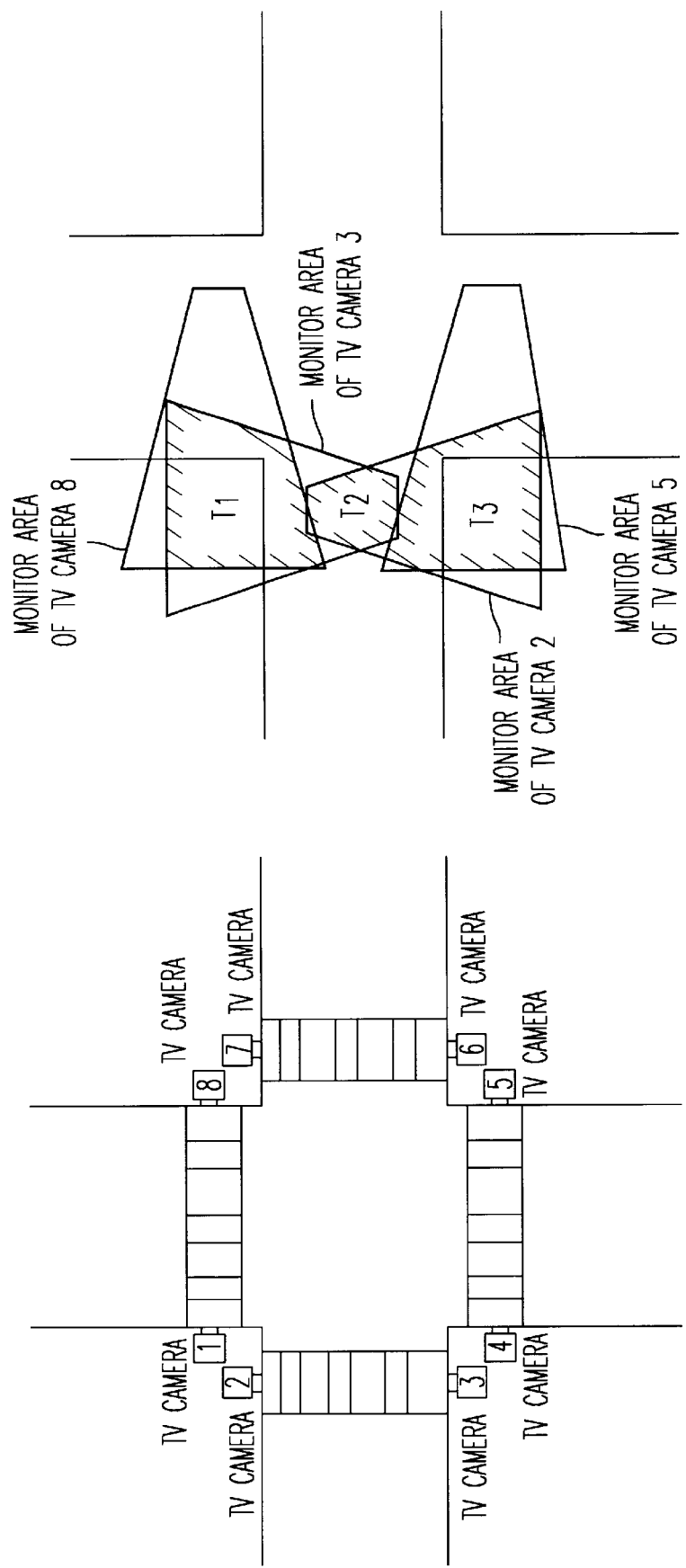
FIG. 4 is a schematic diagram of monitor area and TV camera location.
FIG. 5 is a schematic diagram of view area of TV camera.

The selection section 4 selects two projection data from n units of the projection data supplied through the image projection section i ($1 \leq i \leq n$) and outputs the two projection data to the comparison section j ($1 \leq j \leq m$) (S3 in FIG. 2). A combination of the two projection data is previously set and this combination information is memorized in the selection section 4. For example, as shown in an intersection of FIG. 4, assume that a person walking on the marked crosswalk and a person waiting for the traffic signal at this side of the marked crosswalk are monitored by eight units of TV cameras. Each camera has an observation view as shown in FIG. 5 (In FIG. 5, the observation view of TV cameras 2, 3, 5, 8 are only shown). In order to monitor the area T1, the two projection data from the image projection section 3 connected to TV camera 3 and the image projection section 8 connected to TV camera 8 are outputted to the comparison section 1. In order to monitor the area T2, the two projection data from the image projection section 2 connected to TV camera 2 and the image projection section 3 connected to TV camera 3 are outputted to the comparison section 2. In order to monitor the area T3, the two projection data from the image projection section 2 connected to TV camera 2 and the image projection section 5 connected to TV camera 5 are outputted to the comparison section 3.

Figure 6:
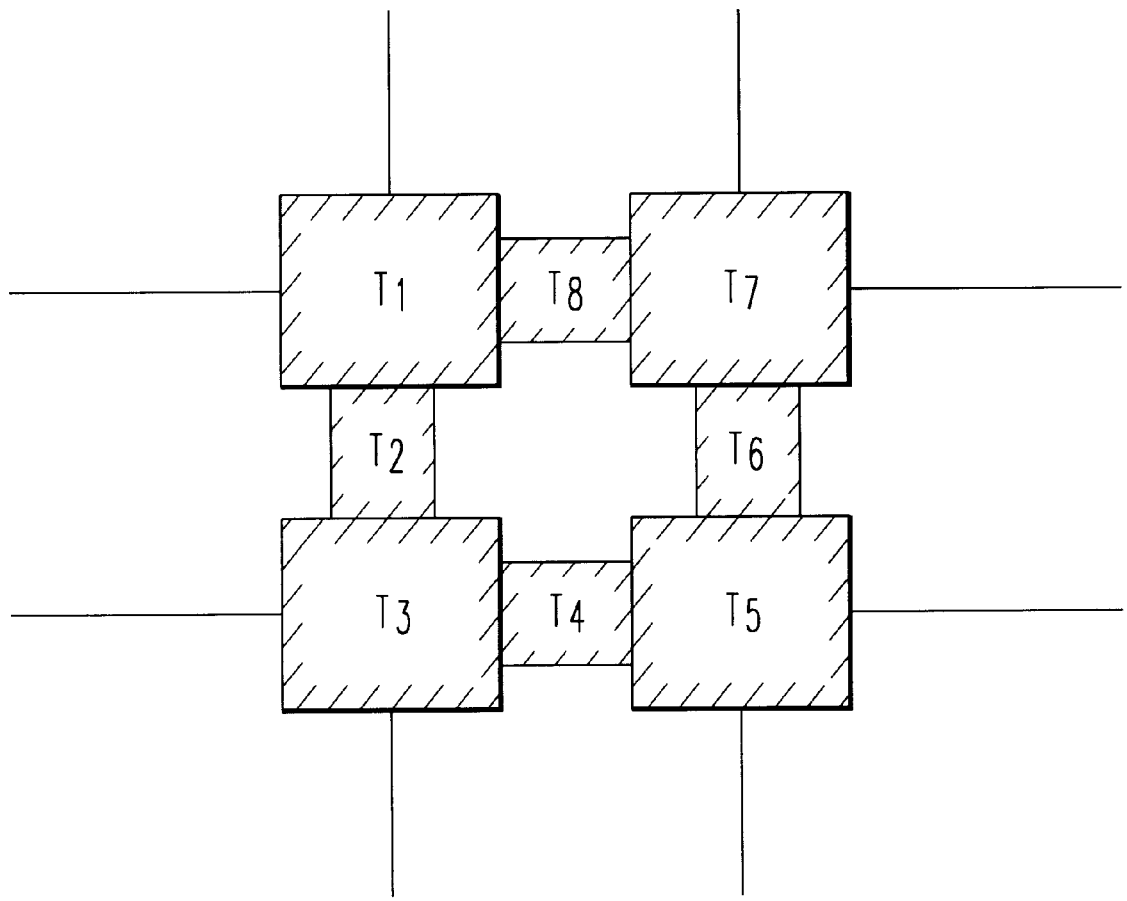
FIG. 6 is a schematic diagram of monitor area in charge of two TV cameras.

As mentioned-above, assume that eight monitor areas T1~T8 are set in the intersection as shown in FIG. 6. In order to monitor the areas T4~T8, by control of the selection section 4, the two projection data from the image projection section 4 and the image projection section 5 are outputted to the comparison section 4, the two projection data from the image projection section 4 and the image projection section 7 are outputted to the comparison section 5, the two projection data from the image projection section 6 and the image projection section 7 are outputted to the comparison section 6, the two projection data from the image projection section 1 and the image projection section 6 are outputted to the comparison section 7, and the two projection data from the image projection section 1 and the image projection section 8 are outputted to the comparison section 8. In this way, the selection section 4 selects a combination of two image projection section i ($1 \leq i \leq n$) connected to each comparison section j ($1 \leq j \leq m$) and outputs the two projection data to the comparison section.

The comparison section j ($1 \leq j \leq m$) compares the two projection data by unit of same position on the plane P and extracts an area R consisting of positions, the two projection data being different (S4 in FIG. 2). Assume that the projection data k1 from the image projection section i1 and the projection data k2 from the image projection section i2 are outputted to the comparison section j ($1 \leq j \leq m$). The projection data k1, k2 consists of the following projection coordinate value and intensity value.

Figure 7:
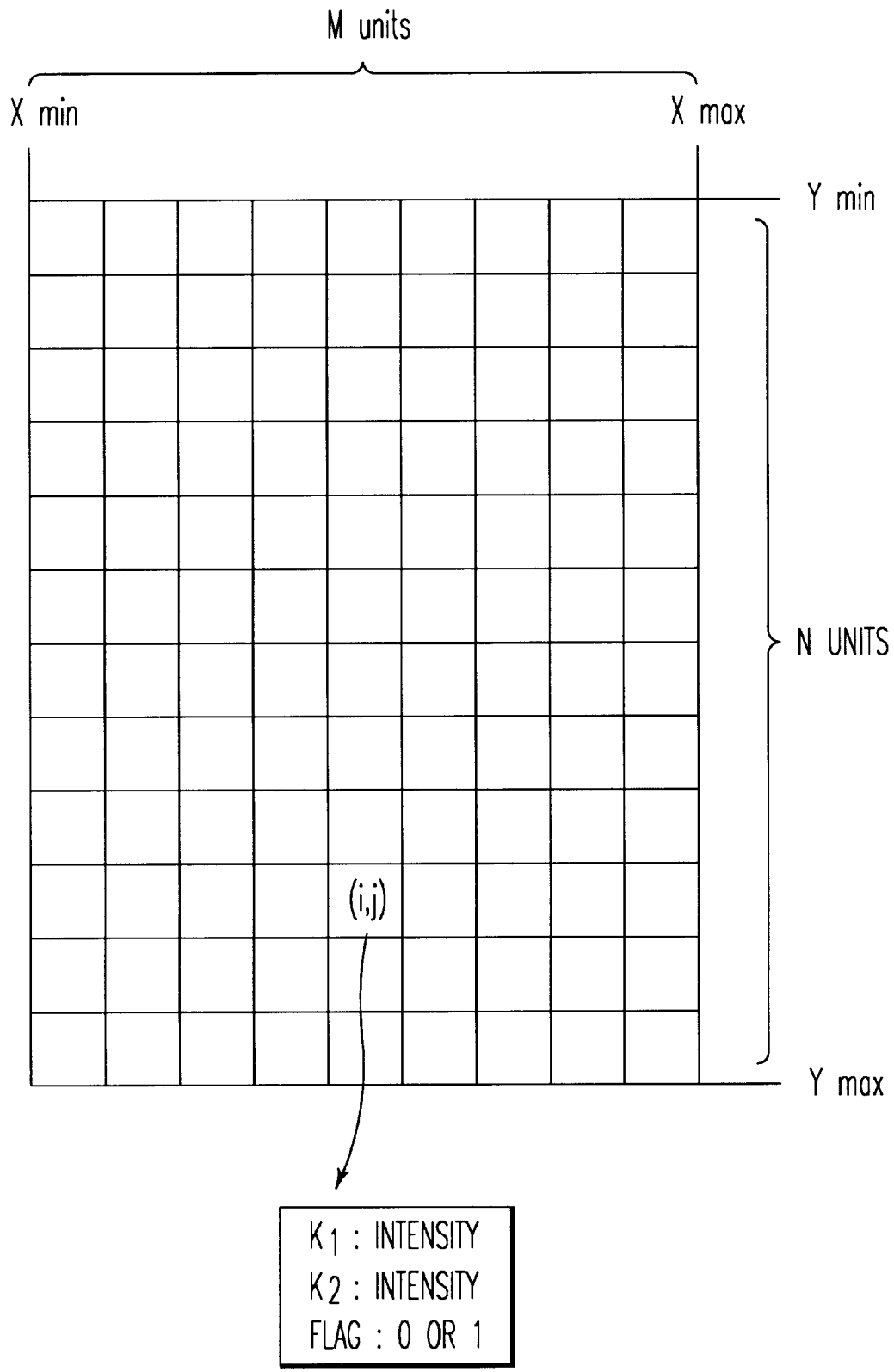
FIG. 7 is a schematic diagram of plane memory of which a predetermined unit stores density values of the projected two images.

$k1 = (Q1_{1x}, Q1_{1y}, Q1_{1z}, I1_1), (Q1_{2x}, Q1_{2y}, Q1_{2z}, I1_2), \ldots$ $k2 = (Q2_{1x}, Q2_{1y}, Q2_{1z}, I2_1), (Q2_{2x}, Q2_{2y}, Q2_{2z}, I2_2), \ldots$ Q1, Q2: projection coordinate value
I1, I2: intensity value of projected pixel As for the projection coordinate values defined by k1, k2, the maximum value Xmax and minimum value Xmin for X coordinate values are determined. In the same way, the maximum value Ymax and minimum value Ymin for Y coordinate values are determined. An area memory of two-dimensional arrangement (M×N) is prepared as shown in FIG. 7. This area memory is equally divided from Xmin to Xmax into M units and equally divided from Ymin to Ymax into N units. The intensity values of each pixel in the projection data k1, k2 are written in an address (unit) corresponding to the projection position on the area memory. The information written in each unit (i, j) consists of the intensity values of k1, k2 and a flag value (0 or 1). If x-coordinate value Q1ix and y-coordinate value Q1iy of a pixel of k1 are included in following limit, the intensity value of the pixel is written in k1 area of the unit (i, j) on the area memory.

$$X_{min} + \frac{X_{max} - X_{min}}{M}(i - 0.5) < Q1_{ix} < X_{min} + \frac{X_{max} - X_{min}}{M}(i + 0.5)$$

$$Y_{min} + \frac{Y_{max} - Y_{min}}{N}(j - 0.5) < Q1_{iy} < Y_{min} + \frac{Y_{max} - Y_{min}}{N}(j + 0.5)$$

In same way, if the x-coordinate value Q2ix and y-coordinate value Q2iy of a pixel of k2 are included in the following limit, the intensity value of the pixel is written in k2 area of the unit (i, j) on the area memory.

$$X_{min} + \frac{X_{max} - X_{min}}{M}(i - 0.5) < Q2_{ix} < X_{min} + \frac{X_{max} - X_{min}}{M}(i + 0.5)$$

$$Y_{min} + \frac{Y_{max} - Y_{min}}{N}(j - 0.5) < Q2_{iy} < Y_{min} + \frac{Y_{max} - Y_{min}}{N}(j + 0.5)$$

After the intensity values of all pixels of k1, k2 are written in the area memory, the unit (i, j) the intensity value of which is not written in k1 area or k2 area is searched by scanning the area memory. Then, this empty data is calculated by linear-interpolation of the neighboring data. In this case, in the unit (i, j), the interpolation for k1 data is calculated by neighboring k1 data and the interpolation for k2 data is calculated by neighboring k2 data.

Figure 8:
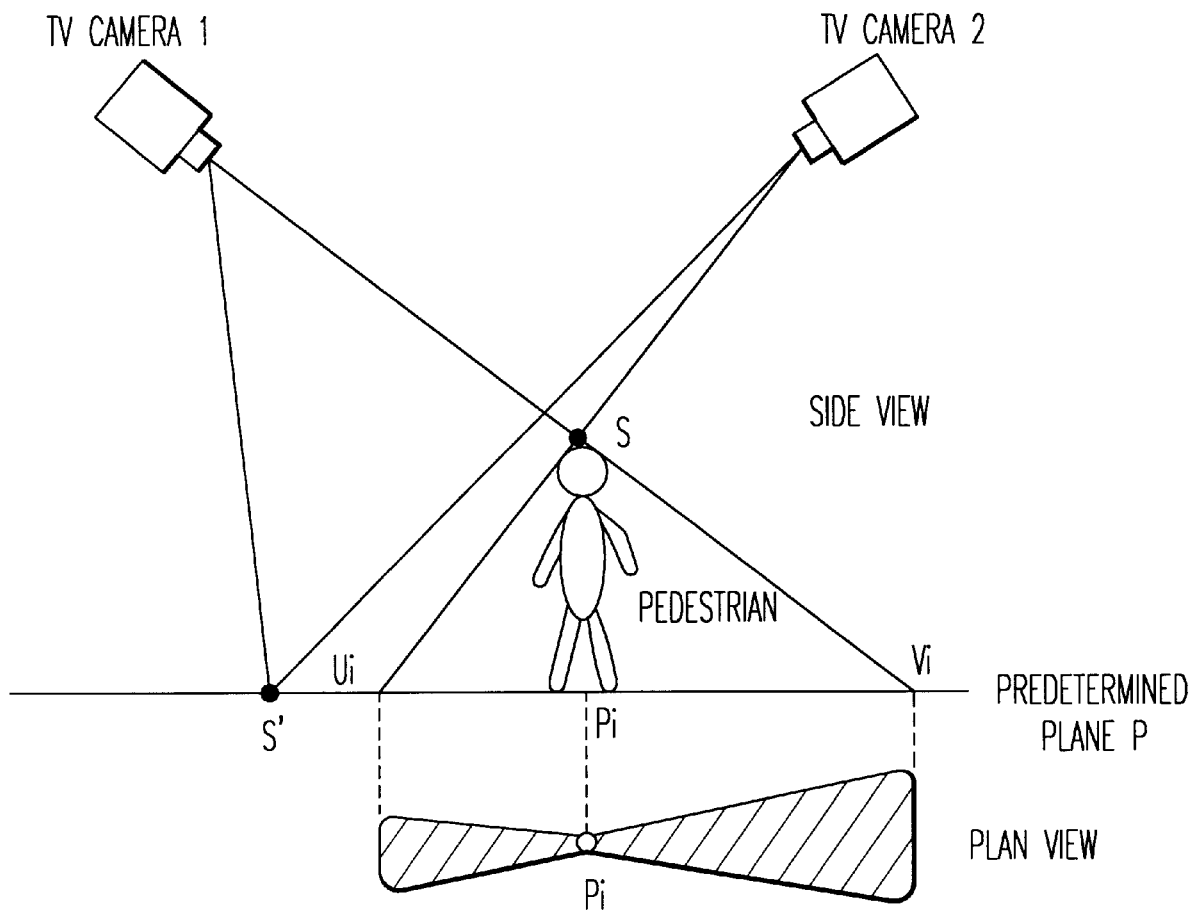
FIG. 8 is a schematic diagram of the projection position of a pedestrian on the predetermined plane from view positions of two TV cameras.

Next, the comparison section j ($1 \leq j \leq m$) calculates the absolute value "Dif (i, j)" of the difference of the intensity values of k1 area and k2 area in each unit (i, j) on the area memory. If Dif (i, j) is above a threshold, the flag value "1" is written in the unit (i, j). If Dif (i, j) is not above a threshold, the flag value "0" is written in the unit (i, j). As shown in FIG. 8, as for point S' on the predetermined plane P, a projection point from TV camera 1 is the same as a projection point from TV camera 2. In this case, Dif (i, j) is not above the threshold and the flag value "0" is written in the unit (i, j) including the point S'. On the other hand, as for a head point S of the pedestrian, the projection point Vi from TV camera 1 is different from the projection point Ui from TV camera 2. In this case, Dif (i, j) is above the threshold in two units including the points Vi, Ui. Therefore, the flag value "1" is written in the two units. As shown in FIG. 8, in case of the existence of the pedestrian in the plane, a wedge-shaped area of the flag value "1" is spread as a starting point of the pedestrian position along the view direction of the TV camera on the area memory. After the flag value is written in all units (i, j) on the area memory, the flag values of all units on the area memory are outputted to the extraction section j ($1 \leq j \leq m$). In the above calculation, the average value Dif (i, j) may be normalized by an average of the intensity values of k1 area and k2 area in the unit (i, j), and used instead of the absolute difference value Dif (i, j) itself. Furthermore, the flag value is not limited to "0, 1" and may be a value to discriminate the state.

Figure 9:
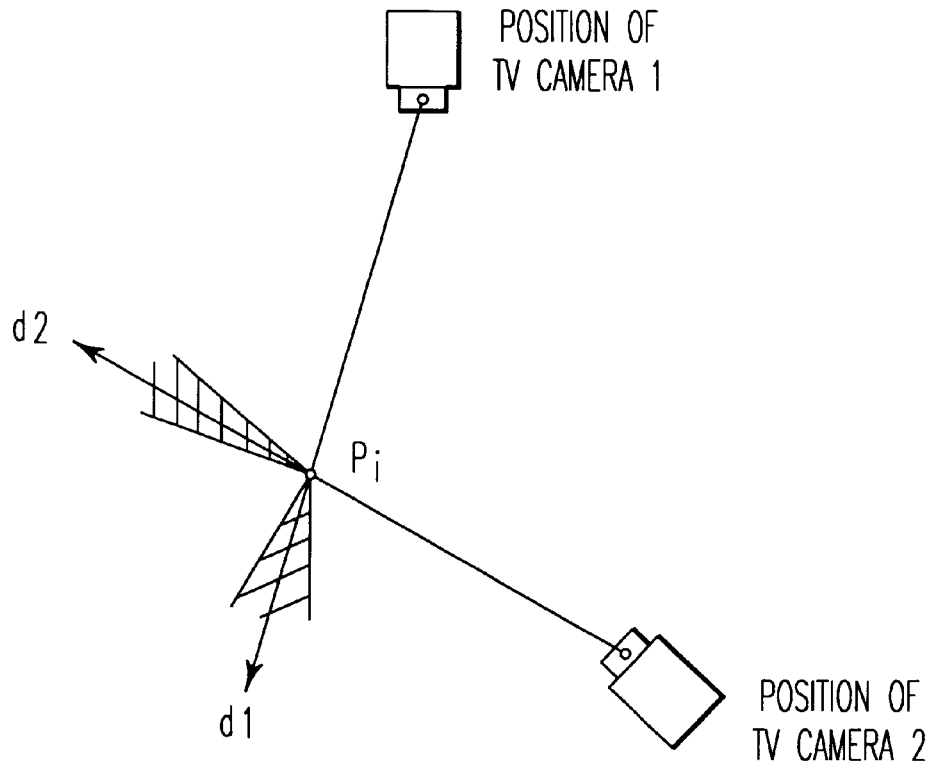
FIG. 9 is a schematic diagram of two wedge-shaped areas projected from two positions of TV cameras.
Figure 10:
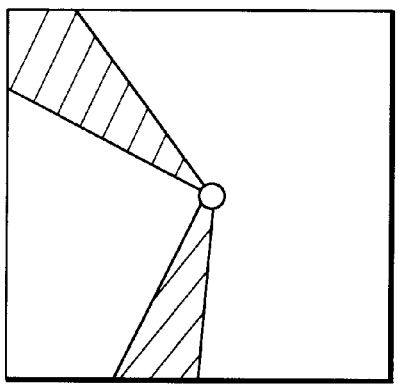
FIG. 10 is a schematic diagram of comparison mask on the plane memory.

The extraction section j ($1 \leq j \leq m$) scans the flag values of all units on the area memory outputted from the comparison section J, extracts the units of the flag value "1" as two wedge-shaped areas respectively extended as a common starting point, and outputs the starting point as the existence position of the pedestrian to the integration section 7 (S5 in FIG. 2). The extended direction of the wedge-shaped area on the area memory is the same as the vector direction from the focus position of the TV camera to the pedestrian position in the coordinate axis Cxyz. For example, as shown in FIG. 9, assume that the unit (i, j) on the area memory includes the pedestrian position Pi in the coordinate axis Cxyz. In this case, the wedge-shaped area from TV camera 1 is extended along the d1 direction and the wedge-shaped area from TV camera 2 is extended along the d2 direction. The focus position (view position) of the TV camera and the position of the each unit (i, j) of the area memory are previously known. Therefore, the extended direction of the wedge-shaped area in each unit (i, j) is determined and a template consisting of the wedge-shaped area along the extended direction is generated. In case of the wedge-shaped area extending along directions d1, d2 in FIG. 9, the template as shown in FIG. 10 is generated. The center point (begining point) of the template is assigned to the unit (i, j) on the area memory. If the pedestrian exists in the unit (i, j) on the area memory, the flag value "1" is mainly written in the units included in the oblique line area of the template. Therefore, the sum of the flag value "1" included in the oblique line area of the template is calculated. If the sum is above a threshold, the center point of the template is regarded as the existence position of the pedestrian in the coordinate axis Cxyz.

The integration section 7 integrates the existence position of the pedestrian outputted from each extraction section j ($1 \leq j \leq m$), and calculates the existence positions, number, direction and speed of all pedestrians of all monitor areas in the coordinate axis Cxyz (S6 in FIG. 2). Each extraction section j ($1 \leq j \leq m$) outputs the existence position of the pedestrian based on the coordinate axis Cxyz. Therefore, the existence positions and the number of all pedestrians are directly calculated. Furthermore, by corresponding a present pedestrian's position to a previous pedestrian's position neighboring the present pedestrian's position, the direction and the speed of the same pedestrian is calculated.

Figure 11:
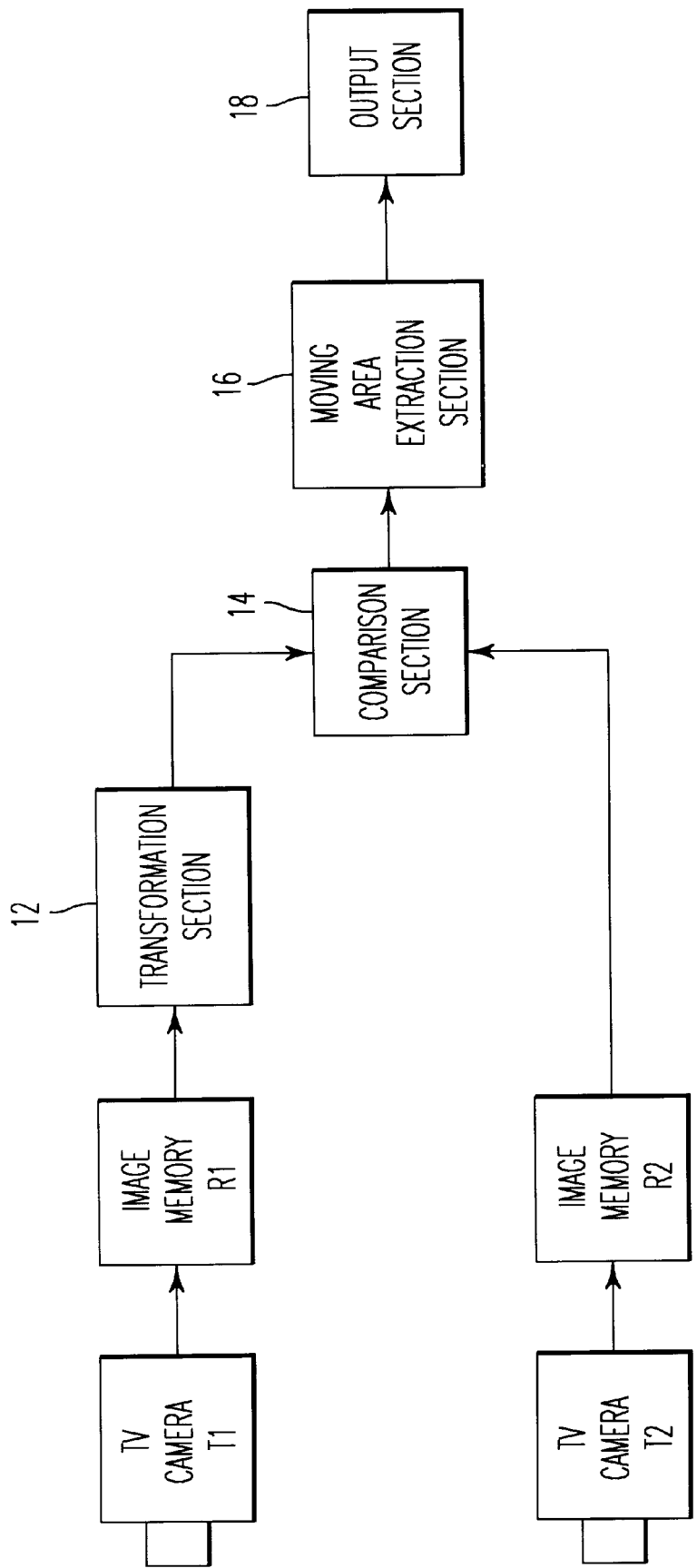
FIG. 11 is a block diagram of the image monitor apparatus according to a second embodiment of the present invention.
Figure 12:
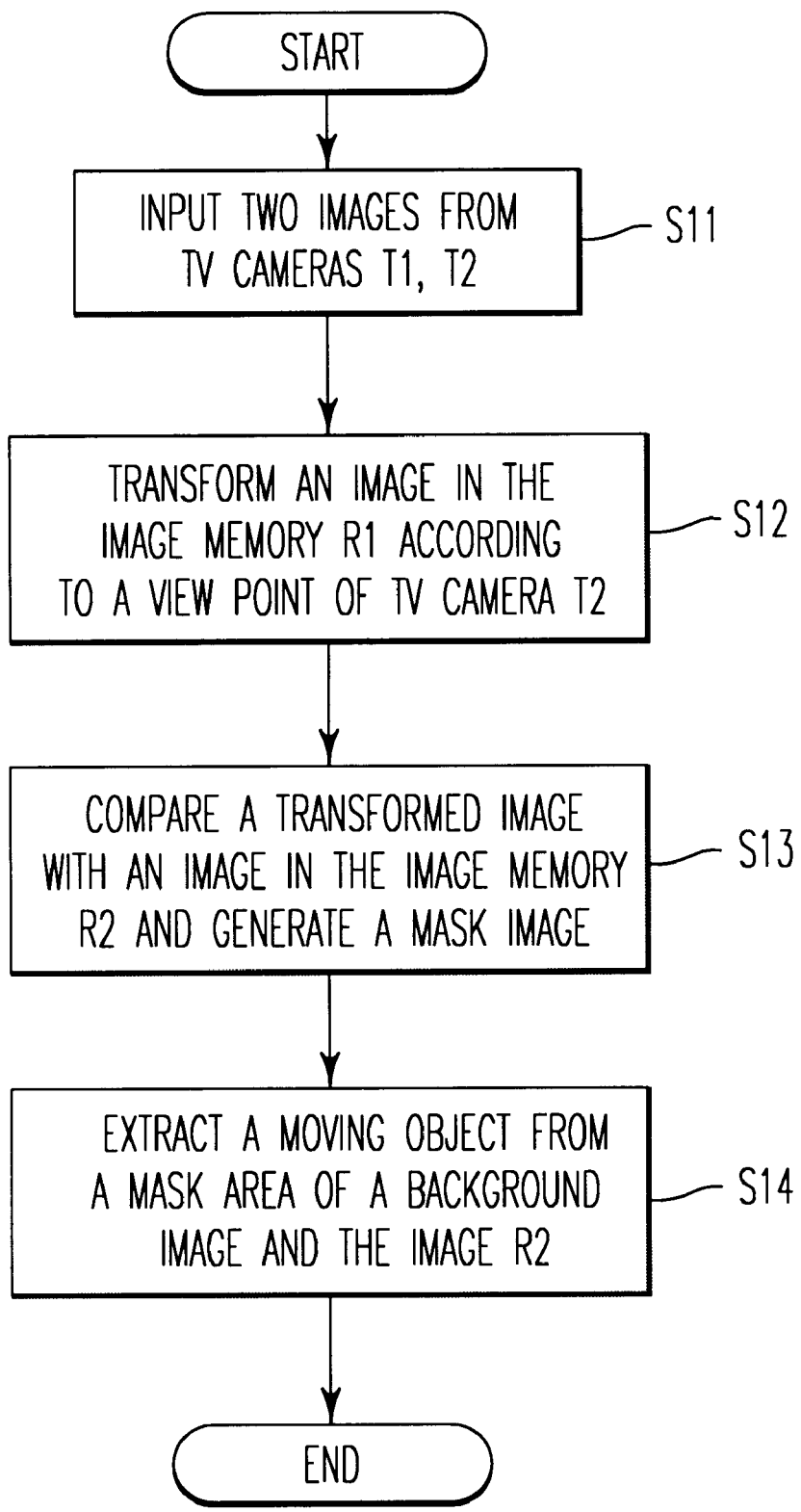
FIG. 12 is a flow chart of the processing of the image monitor method according to the second embodiment of the present invention.
Figure 13:
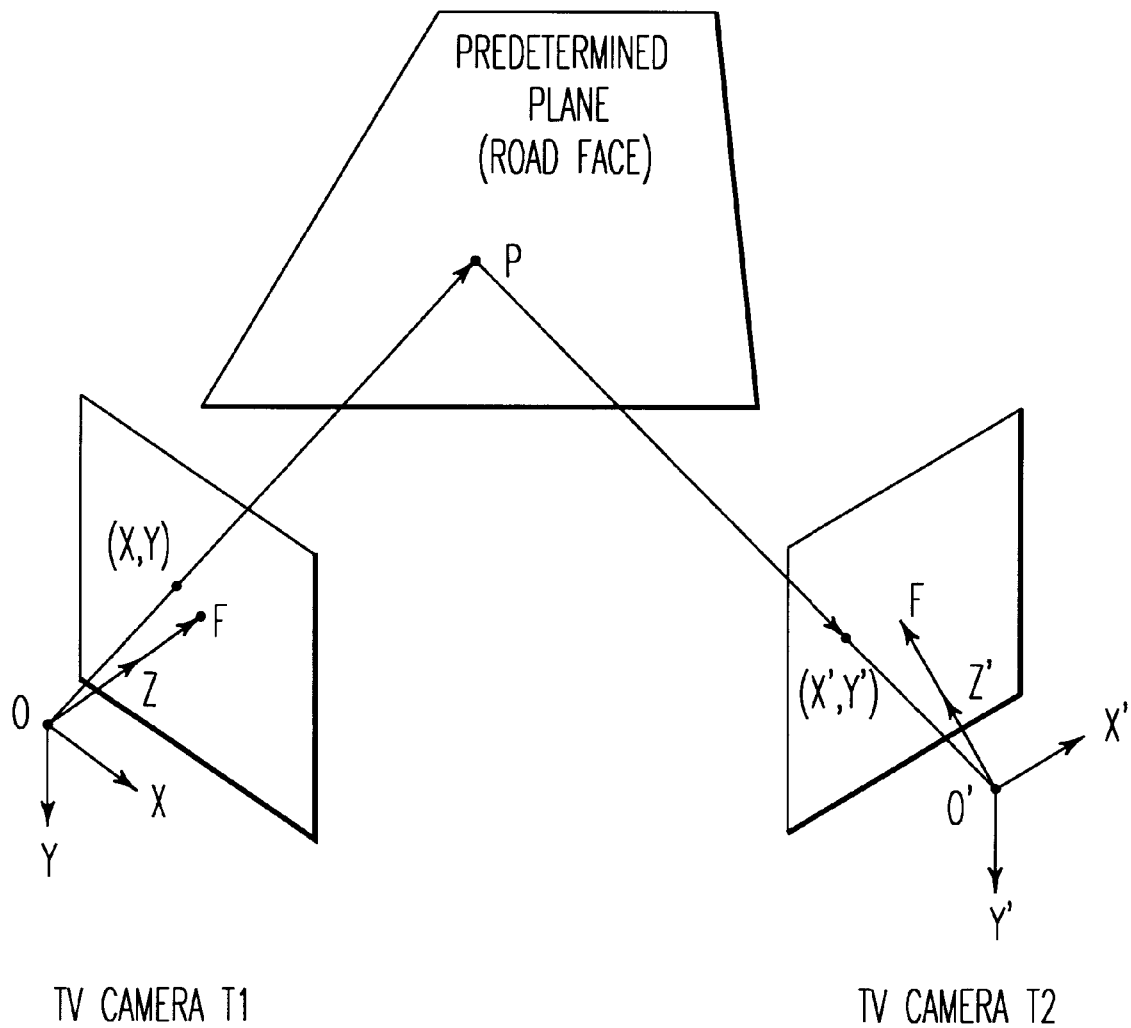
FIG. 13 is a schematic diagram of transformation method of one image inputted from one view position according to the other view position.

FIG. 11 is a block diagram of the image monitor apparatus according to the second embodiment of the present invention. The image monitor apparatus includes TV camera Ti ($1 \leq i \leq 2$), the image memory Ri ($1 \leq i \leq 2$), a transformation section 12, a comparison section 14, a moving area extraction section 16, and an output section 18. FIG. 12 is a flow chart of the processing of the image monitor method according to the second embodiment of the present invention. First, two images are respectively inputted from TV camera Ti ($1 \leq i \leq 2$) and stored in the image memory Ri ($1 \leq i \leq 2$) (S11 in FIG. 12). The transformation section 12 projects the image stored in the image memory R1 onto a predetermined plane and transforms a projected image on the predetermined plane to a view image from TV camera T2 (S12 in FIG. 12). For example, in the second embodiment, the predetermined plane is a road surface. As shown in FIG. 13, assume that the camera-coordinate axis of TV camera T1 is O-XYZ, the camera-coordinate axis of TV camera T2 is O'-X'Y'Z', the focal length of TV cameras T1, T2 are f, the projection point of a coordinate (x, y) of the image of TV camera T1 onto the predetermined plane is P, and the coordinate of a projection point of the point P onto TV camera T2's image is (x', y'). In this case, the relationship between the coordinates (x, y) and (x', y') is expressed as follows.

$$x' = f \frac{M_{11}x + M_{21}y + M_{31}f}{M_{13}x + M_{23}y + M_{33}f} \quad (1)$$

$$y' = f \frac{M_{12}x + M_{22}y + M_{32}f}{M_{13}x + M_{23}y + M_{33}f} \quad (2)$$

In the above expression, Mij ($1 \leq i \leq 3$, $1 \leq j \leq 3$) are the transformation parameters. In the two images of TV cameras T1, T2, at least five pairs of corresponding points (x, y) (x', y') are set. The transformation parameters are calculated with a least square method. Therefore, after locating TV cameras T1, T2, at least five feature points (for example, a corner point included in a marked crosswalk or a center line) are respectively selected in the two images of TV cameras T1, T2. The feature points are correlated between the two images of TV cameras T1, T2 and the transformation parameters Mij are calculated by using the corresponding feature points between the two images. The transformation parameter is determined before activation of the image monitor apparatus because the TV camera is in a fixed position.

By using the transformation parameter Mij and the focal length f, transformed coordinate (x', y') of each pixel coordinate (x, y) of the image of TV camera T1 is calculated by the expressions (1) (2) and a transformed image IM (x, y) from TV camera T1 to TV camera T2 is created. The transformed image IM (x, y) consists of pixels each of which has a transformed coordinate (x', y') included in an image area of TV camera T2 (for example, in case of 640×480 pixels as the image area of TV camera T2, $0 \leq x' \leq 640$, $0 \leq y' \leq 480$).

Figure 14A:
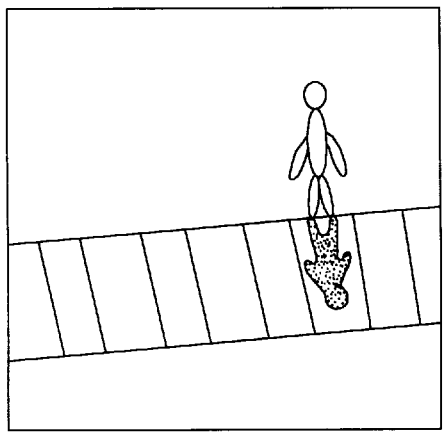
FIGS. 14A–14E are schematic diagrams of one image, another image, the one image transformed, a mask image, and a background image.
Figure 14B:
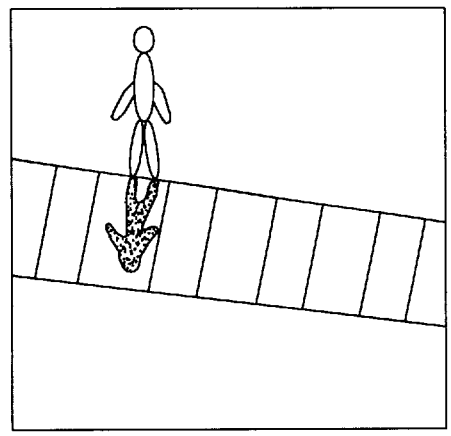
Figure 14C:
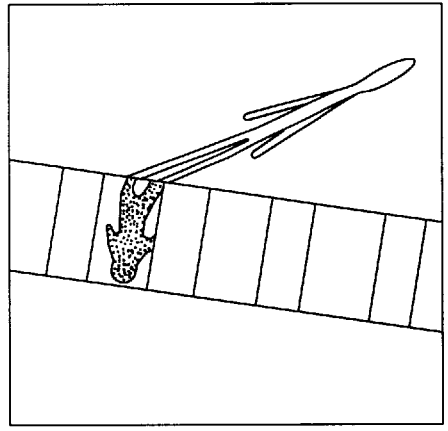

FIG. 14A shows the image of TV camera T1 in which a pedestrian on the marked crosswalk is taken and FIG. 14B shows the image of TV camera T2 for the same scene of TV camera T2. The transformation section 12 transforms the image of TV camera T1 of FIG. 14A to an image of FIG. 14C, in which positions of the marked crosswalk and the shadow of the pedestrian on the road surface are the same as the image of FIG. 14B. In this case, the pedestrian's image is transformed as fallen down and elongated shape because the height of the pedestrian is different from the height of the road surface. The position of the pedestrian on the transformed image is different from the image of TV camera T2 as shown in FIGS. 14B and 14C.

The comparison section 14 compares the intensity value of the transformed image IM (x, y) with the image I2 (x, y) of the image memory R2 by unit of the same pixel position, and calculates the similarity of each pixel position (S13 in FIG. 12). In this case, an original image of the transformed image IM (x, y) and the image I2 (x, y) are respectively inputted through TV camera T1 and TV camera T2 at the same timing. As the similarity degree, the following correlation value C1 is used.

$$C1 = \frac{\sum |I_M - I_2|}{\sqrt{(\sum I_M^2 \sum I_2^2)}}$$

Figure 14D:
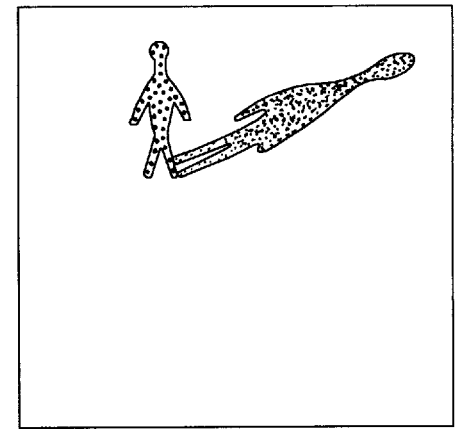

In this way, the similarity degree C1 of each pixel between IM (x, y) and I2 (x, y) is calculated. Then, an area consisting of pixels, the similarity degree of which is above a threshold (Thr), is extracted as a mask image (S13 in FIG. 12). For example, an image consisting of pixel value "255" (if C1>Thr) and pixel value "0" (if $C \leq$ Thr) is created as the mask image. In this mask image the pixel value included in the object area whose height is different from the road surface is only "255". Therefore, as shown in FIG. 14D, the sum area of the pedestrian's area in the image I2 (x, y) and the pedestrian's area in the transformed image IM (x, y) is generated as the mask image. The shadow of the pedestrian on the road surface is located at the same position in the image I2 and the transformed image IM. Therefore, the correlation value C1 for the shadow area is small and not included in the intensity "255" area of the mask image. In this way, the shadow area of the pedestrian is excluded in the mask image.

Instead of the correlation value C1, the following correlation values C2, C3, C4 may be used.

$$C2 = \sum |I_M - I_2|$$

$$C3 = \sum (I_M - I_2)^2$$

$$C4 = \frac{\sum (I_M - I'_M)(I_2 - I'_2)}{\sqrt{\sum (I_M - I'_M)^2 \sum (I_2 - I'_2)^2}}$$

In the above expressions, I'M and I'2 are respectively the average values of the pixel values in the predetermined area of the image IM and I2.

Figure 14E:
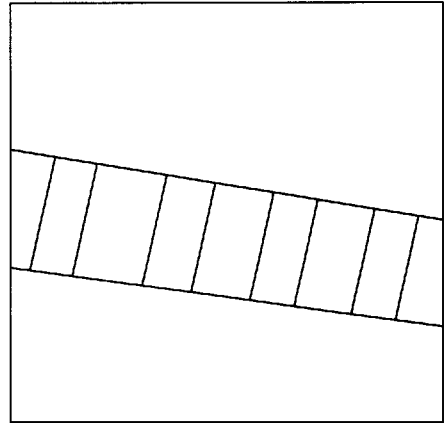

The moving area extraction section 16 extracts a moving area from the mask area consisting of the pixel value "255" in the mask image (S14 in FIG. 12). The mask area is the sum of the dotted area and black area in FIG. 14D. In this case, a background image in which the pedestrian and the car do not exist is previously inputted to TV camera T2. A first image area corresponding to the mask area is extracted from the background image shown in FIG. 14E and a second image area corresponding to the mask area is extracted from the Image I2 shown in FIG. 14B. Then, a difference value between the first image area and the second image area is calculated by unit of the same position. An area of pixels, the difference value of which is large, is extracted from the mask area as the moving area. In order to create the background image, the average value, most frequent value, or intermediate value of each pixel is calculated from a series of images of TV camera T2 stored for a predetermined time. The background image is created by using the average value, the most frequent value or the intermediate value, and updated at predetermined intervals.

Furthermore, instead of the difference value, the appearance frequency (probability) of the intensity of each pixel in the image is prepared as the background data. If the intensity of the pixel in the mask area is larger than the appearance frequency of the intensity at the same pixel position, the pixels may be extracted from the mask area as the moving area.

Furthermore, at timing (t) and (t+Δt), the comparison section 14 respectively creates the mask image M (t) and the mask image M (t+Δt). In this case, a merged mask image M (t) U M (t+Δt) is created. On the other hand, at the same timing (t) and (t+Δt), the TV camera T2 respectively inputs the image I2 (t) and the image I2 (t+Δt). Then, a merged mask area consisting of pixel value "255" is extracted from the merged mask image. A first image area corresponding to the merged mask area is extracted from the image I2 (t). A second image area corresponding to the merged mask area is extracted from the image I2 (t+Δt). A difference value between the first image area and the second image area is calculated by unit of the same pixel position. An area of pixels, the difference value of which is large, is extracted from the merged mask area as the moving area.

In this way, the moving area extraction section 16 extracts the moving area from the mask area. Therefore, a still object such as a stationary car or a median whose height is different from the road surface is excluded from the mask area, and the moving object such as the pedestrian is extracted from the mask area. In the moving area extraction section 16, an optical flow method to extract the moving area may be used.

The output section 18 calculates an area, the lowest edge position in the image, and the moving direction by using the moving area of the pedestrian and the traffic car, and outputs necessary data such as the number of the pedestrians, cars, each distance, and each movement direction.

In the second embodiment, the input image of TV camera T1 is transformed according to the view position of TV camera T2, and the moving area is extracted by using the transformed image and the input image of TV camera T2. However, the input image of TV camera T2 may be transformed according to the view position of TV camera T1, and the moving area may be extracted by using the transformed image and the input image of TV camera T1.

Furthermore, when the input image of TV camera T1 is transformed according to the view position of TV camera T2 and the mask image is created by using the transformed image, the mask image may be retransformed according to the view position of TV camera T1, and the moving area may be extracted by using the retransformed image and the input image of TV camera T1.

In the second embodiment, two units of TV cameras are used. However, a plurality of TV cameras above two units are previously located so that these view areas partially overlap each other. A pair of two TV cameras is selected from the plurality of TV cameras in order. By using each pair of two TV cameras, the above-mentioned processing is executed. In this case, a wider view area than the view area of each TV camera is monitored.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An image monitor apparatus, comprising:

a plurality of image input means for respectively inputting an image based on each different view position in order to input the images of a predetermined plane, an existence area of a monitored object on the predetermined plane being commonly viewed by two of the plurality of image input means;

image projection means for projecting each of the plurality of images onto a plane memory corresponding to the predetermined plane;

comparison means for comparing projected image data of two images from the two image input means by unit of a predetermined area on the plane memory, and for extracting a plurality of predetermined areas, each area including two different projected image data, from the plane memory;

extraction means for detecting two wedge-shaped areas extended from a common starting point along a respective direction from the plurality of predetermined areas, and for extracting the common starting point as a position of the monitored object; and integration means for integrating a plurality of the positions of the monitored objects respectively extracted from each two wedge-shaped areas including two different projected image data of two images in the plurality of images as the existence area of the monitored objects on the predetermined plane.

2. The image monitor apparatus according to claim 1, wherein the plurality of image input means are previously located at each different view position in order to input the images of the predetermined plane from the view position.

3. The image monitor apparatus according to claim 1,
further comprising a plurality of image memory means for respectively storing the image inputted through the plurality of image input means.

4. The image monitor apparatus according to claim 1,
further comprising a selection means for selecting two images from the plurality of inputted images, the two images being respectively inputted through two image input means located adjacent the existence area of the monitored object, and for supplying the two images to said comparison means.

5. The image monitor apparatus according to claim 4,
wherein the predetermined plane is a flat area of a road surface commonly viewed by the two image input means, and
wherein the projected image data includes projected (x, y) coordinates and a density value by unit of original (x, y) coordinate on the input image.

6. The image monitor apparatus according to claim 5,
wherein said comparison means selects a maximum value and a minimum value of the projected (x, y) coordinates of the two images, assigns each projected image data of the two images to a plane memory corresponding to the predetermined plane,
the plane memory being equally divided into the predetermined area between the maximum value and the minimum value along (x, y) coordinate axis, and
the density values of the two images being stored in the predetermined area of the plane memory including the projected (x, y) coordinate.

7. The image monitor apparatus according to claim 6,
wherein said comparison means compares the density values of the two images stored in each predetermined area of the plane memory, and extracts the predetermined area if a difference between the density values of the two images is above a threshold.

8. The image monitor apparatus according to claim 1,
wherein the respective direction along which the two wedge-shaped areas extend is the same as a direction of a vector from the view position of said image input means to a projection position onto the plane.

9. An image monitor apparatus, comprising:
at least two image input means for respectively inputting an image based on each different view position in order to input two images of a predetermined plane at the same timing;
transformation means for projecting the image inputted through one image input means onto the predetermined plane, and for transforming the projected image according to a view position of the other image input means;
comparison means for comparing image data of the transformed image with image data of the image inputted through the other image input means by unit of the same position on the image, and for generating a mask area representing positions of different image data according to the comparison result; and
extraction means for extracting an area of a moving object from the mask area by using the mask area in a plurality of the images inputted through the other image input means.

10. The image monitor apparatus according to claim 9,
further comprising at least two image memory means for respectively storing the image inputted through the at least two image input means.

11. The image monitor apparatus according to claim 9,
wherein the two image input means are previously located at different view positions in order to input the image of a predetermined plane commonly viewed by the two image input means, a focal length of the two image input means being equal.

12. The image monitor apparatus according to claim 11,
wherein said transformation means transforms the image by using transformation parameters, the transformation parameters are previously calculated by correspondence of a plurality of position on the predetermined plane between two images inputted through the one image input means and the other image input means.

13. The image monitor apparatus according to claim 9,
wherein said comparison means compares a density value of the transformed image of the one image input means with a density value of the input image of the other image input means by unit of the same pixel position, and extracts the pixel positions wherein a correlation value representing a difference of the density values between the transformed image and the input image is above a threshold as the mask area.

14. The image monitor apparatus according to claim 13,
wherein said extraction means extracts a first area of the mask area from a background image without a monitored object inputted through the other image input means, extracts a second area of the mask area from the input image of the other image input means, and extracts a difference area between the first area and the second area as the moving object.

15. The image monitor apparatus according to claim 13,
wherein said extraction means creates a merged mask area of the mask area of time (t) and the mask area of time (t+$\Delta$t), extracts a first area of the merged mask area from the input image of time (t) of the other image input means, extracts a second area of the merged mask area from the input image of time (t+$\Delta$t) of the other image input means, and extracts a difference area between the first area and the second area as the moving object.

16. A method for monitoring an object in an image, comprising the steps of:
inputting a plurality of images from each different view position in order to input the images of a predetermined plane, an existence area of a monitored object on the predetermined plane being commonly viewed by two of the plurality of images;
projecting each of the plurality of images onto a plane memory corresponding to the predetermined plane;
comparing projected image data of two images by unit of a predetermined area on the plane memory;
extracting a plurality of predetermined areas, each area including two different projected image data, from the plane memory;
detecting two wedge-shaped areas extended from a common starting point along a respective direction from the plurality of predetermined areas;
extracting the common starting point as a position of the monitored object; and
integrating a plurality of the positions of the monitored objects respectively extracted from each two wedge-shaped areas including two different projected image data of two images in the plurality of images as the existence area of the monitored objects on the predetermined plane.

17. A method for monitoring an object in an image, comprising the steps of:

inputting two images from each different view position in order to input two images of a predetermined plane at the same timing;

projecting one image inputted from one view position onto the predetermined plane;

transforming the projected image according to the other view position;

comparing image data of the transformed image with image data of the other image inputted from the other view position by unit of the same position on the image;

generating a mask area representing positions of different image data according to the comparison result; and extracting an area of a moving object from the mask area by using the mask area in a plurality of the other images.

18. A computer readable memory containing computer readable instructions, comprising:

instruction means for causing a computer to input a plurality of images from each different view position in order to input the images of a predetermined plane, an existence area of a monitored object on the predetermined plane being commonly viewed by two of the plurality of images;

instruction means for causing a computer to project each of the plurality of images onto a plane memory corresponding to the predetermined plane;

instruction means for causing a computer to compare projected image data of two images by unit of a predetermined area on the plane memory;

instruction means for causing a computer to extract a plurality of predetermined areas, each area including two different projected image data, from the plane memory;

instruction means for causing a computer to detect two wedge-shaped areas extended from a common starting point along a respective direction from the plurality of predetermined areas;

instruction means for causing a computer to extract the common starting point as a position of the monitored object; and instruction means for causing a computer to integrate a plurality of positions of the monitored objects respectively extracted from each two wedge-shaped areas including two different projected image data of two images in the plurality of images as the existence area of the monitored objects on the predetermined plane.

19. A computer readable memory containing computer readable instructions, comprising:

instruction means for causing a computer to input two images from each different view position in order to input two images of a predetermined plane at the same timing;

instruction means for causing a computer to project one image inputted from one view position onto the predetermined plane;

instruction means for causing a computer to transform the projected image according to the other view position;

instruction means for causing a computer to compare image data of the transformed image with image data of the other image inputted from the other view position by unit of the same position on the image;

instruction means for causing a computer to generate a mask area representing positions of different image data according to the comparison result; and instruction means for causing a computer to extract an area of a moving object from the mask area by using the mask area in a plurality of the other images.

20. An image monitor apparatus, comprising:

a plurality of image input mechanisms configured to respectively input an image based on each different view position in order to input the images of a predetermined plane, an existence area of a monitored object on the predetermined plane being commonly viewed by two of the plurality of image input mechanisms;

an image projection section configured to project each of the plurality of images onto a plane memory corresponding to the predetermined plane;

a comparison section configured to compare projected image data of two images from the two image input mechanisms by unit of a predetermined area on the plane memory, and to extract a plurality of predetermined areas, each area including two different projected image data, from the plane memory;

an extraction section configured to detect two wedge-shaped areas extended from a common starting point along a respective direction from the plurality of predetermined areas, and to extract the common starting point as a position of the monitored object; and an integration section configured to integrate a plurality of the positions of the monitored objects respectively extracted from each two wedge-shaped areas including two different projected image data of two images in the plurality of images as the existence area of the monitored objects on the predetermined plane.

21. The image monitor apparatus according to claim 20, wherein the plurality of image input mechanisms are previously located at each different view position in order to input the images of the predetermined plane from the view position.

22. The image monitor apparatus according to claim 20, further comprising a plurality of image memories configured to respectively store the image inputted through the plurality of image input mechanisms.

23. The image monitor apparatus according to claim 20, further comprising a selection unit configured to select images from the plurality of inputted images, the two images being respectively inputted through two image input mechanisms located adjacent the existence area of the monitored object, and to supply the two images to said comparison section.

24. The image monitor apparatus according to claim 23, wherein the predetermined plane is a flat area of a road surface commonly viewed by the two image input mechanisms, and wherein the projected image data includes projected (x, y) coordinates and a density value by unit of original (x, y) coordinate on the input image.

25. The image monitor apparatus according to claim 24, wherein said comparison section selects a maximum value and a minimum value of the projected (x, y) coordinates of the two images, assigns each projected image data of the two images to a plane memory corresponding to the predetermined plane, the plane memory being equally divided into the predetermined area between the maximum value and the minimum value along (x, y) coordinate axis, and the density values of the two images being stored in the predetermined area of the plane memory including the projected (x, y) coordinate.

26. The image monitor apparatus according to claim 25, wherein said comparison section compares the density values of the two images stored in each predetermined area of the plane memory, and extracts the predetermined area if a difference between the density values of the two images is above a threshold.

27. The image monitor apparatus according to claim 20, wherein the respective direction along which the two wedge-shaped areas extend is the same as a direction of a vector from the view position of said image input mechanism to a projection position onto the plane.

28. An image monitor apparatus, comprising:

at least two image input mechanisms configured to respectively input an image based on each different view position in order to input two images of a predetermined plane at the same timing;

a transformation section configured to project the image inputted through one image input mechanism onto the predetermined plane, and to transform the projected image according to a view position of the other image input mechanism;

a comparison section configured to compare image data of the transformed image with image data of the image inputted through the other image input mechanism by unit of the same position on the image, and to generate a mask area representing positions of different image data according to the comparison result; and an extraction section configured to extract an area of a moving object from the mask area by using the mask area in a plurality of the images inputted through the other image input mechanism.

29. The image monitor apparatus according to claim 28, further comprising at least two image memory memories configured to respectively store the image inputted through the at least two image input mechanisms.

30. The image monitor apparatus according to claim 28, wherein the two image input mechanisms are previously located at different view positions in order to input the image of a predetermined plane commonly viewed by the two image input mechanisms, a focal length of the two image input mechanisms being equal.

31. The image monitor apparatus according to claim 30, wherein said transformation section transforms the image by using transformation parameters, the transformation parameters are previously calculated by correspondence of a plurality of position on the predetermined plane between two images inputted through the one image input mechanism and the other image input mechanism.

32. The image monitor apparatus according to claim 28, wherein said comparison section compares a density value of the transformed image of the one image input mechanism with a density value of the input image of the other image input mechanism by unit of the same pixel position, and extracts the pixel positions wherein a correlation value representing a difference of the density values between the transformed image and the input image is above a threshold as the mask area.

33. The image monitor apparatus according to claim 32, wherein said extraction section extracts a first area of the mask area from a background image without a monitored object inputted through the other image input mechanism, extracts a second area of the mask area from the input image of the other image input mechanism, and extracts a difference area between the first area and the second area as the moving object.

34. The image monitor apparatus according to claim 32, wherein said extraction mechanism creates a merged mask area of the mask area of time (t) and the mask area of time (t+$\Delta$t), extracts a first area of the merged mask area from the input image of time (t) of the other image input mechanism, extracts a second area of the merged mask area from the input image of time (t+$\Delta$t) of the other image input mechanism, and extracts a difference area between the first area and the second area as the moving object.

* * * * *